US008922420B2

(12) United States Patent
Huizing

(10) Patent No.: US 8,922,420 B2
(45) Date of Patent: Dec. 30, 2014

(54) ELECTROMAGNETIC BODY SCANNING SYSTEM, A METHOD AND A COMPUTER PROGRAM PRODUCT

(75) Inventor: Albert Gezinus Huizing, Voorschoten (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 1018 days.

(21) Appl. No.: 13/054,442

(22) PCT Filed: Jul. 17, 2009

(86) PCT No.: PCT/NL2009/050442
§ 371 (c)(1),
(2), (4) Date: Mar. 15, 2011

(87) PCT Pub. No.: WO2010/008290
PCT Pub. Date: Jan. 21, 2010

(65) Prior Publication Data
US 2011/0175625 A1    Jul. 21, 2011

(30) Foreign Application Priority Data

Jul. 17, 2008 (EP) .................................. 08160631

(51) Int. Cl.
*G01S 13/89* (2006.01)
*G01S 13/88* (2006.01)
*G01S 13/04* (2006.01)
*G07C 9/00* (2006.01)
*G06K 9/00* (2006.01)
*G01S 13/00* (2006.01)

(52) U.S. Cl.
CPC ........ *G07C 9/00126* (2013.01); *G06K 9/00369* (2013.01)
USPC ............ 342/22; 342/21; 342/25 R; 342/25 A; 342/25 F; 342/27; 342/175; 342/176; 342/179; 342/195

(58) Field of Classification Search
CPC ......... G01S 13/02; G01S 13/04; G01S 13/88; G01S 13/887; G01S 13/888; G01S 13/89; G01S 13/90; G01S 13/9011; G01S 13/9017; G01S 13/9035; G01S 7/02; G01S 7/41; G01S 7/411; G01S 7/412; G01V 11/006; G01V 8/005; G01V 8/10; G01V 8/12; G01V 8/14; G01V 8/16; G01V 8/18; G01V 8/20; G01V 8/22; G01V 8/24; G01V 8/26; G01N 22/00
USPC ............. 342/21, 22, 27, 28, 89, 90, 175, 176, 342/179, 192–197, 25 R–25 F; 250/336.1, 250/370.01, 370.08, 393; 356/601, 612, 356/613
See application file for complete search history.

(56) References Cited

U.S. PATENT DOCUMENTS 4,209,853 A * 6/1980 Hyatt ............................. 342/179
4,602,257 A * 7/1986 Grisham ...................... 342/25 F
(Continued)

FOREIGN PATENT DOCUMENTS

WO    2005/078462 A1    8/2005

OTHER PUBLICATIONS

Varshney et al., "Registration and Fusion of Infrared and Millimeter Wave Images for Concealed Weapon Detection", Immage Processing, IEEE, 3:532-536 (1999).

*Primary Examiner* — Bernarr Gregory
(74) *Attorney, Agent, or Firm* — Novak Druce Connolly Bove + Quigg$^{LLP}$

(57) ABSTRACT

An electromagnetic body scanning system may include a measuring system for measuring data of radio waves scattered by a body in two distinct subbands; and a computer system. The computer system is arranged for constructing a first image of the body using the measured data, generating synthetic scattered data of the body in a frequency range outside the subbands, and constructing a second image of the body using both the measured data and the synthetic data. The step of constructing a first image includes matching an image to a human model.

14 Claims, 2 Drawing Sheets

(56) References Cited

U.S. PATENT DOCUMENTS

| | | | |
|---|---|---|---|
| 5,327,139 A * | 7/1994 | Johnson | 342/22 |
| 5,384,573 A * | 1/1995 | Turpin | 342/179 |
| 5,455,590 A * | 10/1995 | Collins et al. | 342/179 |
| 5,557,283 A * | 9/1996 | Sheen et al. | 342/179 |
| 5,734,347 A * | 3/1998 | McEligot | 342/196 |
| 5,736,958 A * | 4/1998 | Turpin | 342/179 |
| 5,751,243 A * | 5/1998 | Turpin | 342/179 |
| 5,859,609 A * | 1/1999 | Sheen et al. | 342/179 |
| 6,198,539 B1 * | 3/2001 | Kitayoshi | 342/179 |
| 6,452,532 B1 * | 9/2002 | Grisham | 342/25 C |
| 7,583,391 B2 * | 9/2009 | Lu | 356/601 |
| 2008/0130015 A1 | 6/2008 | Lu | |

* cited by examiner

ELECTROMAGNETIC BODY SCANNING SYSTEM, A METHOD AND A COMPUTER PROGRAM PRODUCT

CROSS-REFERENCE TO RELATED APPLICATIONS

This application is filed under 35 U.S.C. 371 as a U.S. national phase application of PCT/NL2009/050442, having an international filing date of 17 Jul. 2009, which claims the benefit of European Patent Application No. 08160631.1, having a filing date of 17 Jul. 2008, both of which are hereby incorporated by reference.

TECHNICAL FIELD

The invention relates to an electromagnetic body scanning system, comprising a measuring system for measuring data of radio waves scattered by a body in two distinct subbands, and a computer system arranged for constructing a first image of the body using the measured data.

BACKGROUND

Human biometrics using static body shape is a re-emerging technique to uniquely identify people. Over the last 15 years, numerous 3D body scanners have been developed that can digitize the human form with a high degree of accuracy. These scanners are commercially available and utilize optical or radar frequencies to form digital images of humans for body measurement applications. Up to this point, commercial applications for these scanners have focused on the apparel industry and national size surveys. There are three different categories of body scanners that include laser-scanning, white light projection and radar. Radar is the only one of these scanner technologies that can penetrate clothing, hair and optically opaque plastic disguises.

Holographic radar imaging technology uses harmless microwaves or millimeter waves to illuminate a person under surveillance. These waves readily penetrate through clothing and reflect off water in the skin. The reflected signals are digitized and sent to high-speed computers to form three-dimensional (3-D) images of the person and any concealed objects hidden in their clothes. Microwaves and millimeter waves are electromagnetic waves in the 3-30 GHz and 30-300 GHz ranges respectively. These waves have wavelengths ranging from 1-10 cm for microwaves and 0.1-1.0 cm for millimeter-waves. High resolution imaging in these frequency ranges requires fundamentally different techniques than are used in the optical and infrared ranges. In particular, large apertures with sizes comparable to the target are required to obtain high-quality images. Data collection may be performed by mechanically scanning a measurement system comprising a linear transceiver array using a cylindrical scanner. 3D images are formed by using a combined cylindrical holographic radar imaging technique. The cylindrical data are divided into a number of arc segments, each of which is reconstructed separately and incoherently summed with the others. The resulting 3-D combined image can then be viewed at any desired angle using digital rendering techniques. Computer reconstruction requirements are reduced by performing the minimum number of reconstructions. Each angular segment is typically 90 degrees in extent. The microwave/millimeter-wave linear transceiver array emits a diverging beam that interacts with the imaging target and then measures the amplitude and phase of the scattered wavefronts at each sampled position and frequency over the cylindrical aperture. This dataset is three-dimensional with dimensions consisting of the two aperture dimensions and the frequency dimension. Wavefront reconstruction techniques can be used to mathematically focus these data using computer-based image reconstruction algorithms.

Measurements can be performed at distinct radio subbands for processing the data to arrive at an inverted image of the body.

SUMMARY

It may be desirable to provide an electromagnetic body scanning system, wherein at least one of the disadvantages identified above is reduced. In particular, it may be desirable to obtain an electromagnetic body scanning having an increased resolution without increasing the scanning time. Thereto, according to the disclosure, the computer system of the electromagnetic body scanning system is further arranged for generating synthetic scattered data of the body in a frequency range outside the subbands, and constructing a second image of the body using both the measured data and the synthetic data, wherein the step of constructing a first image comprises matching an image to a human model.

By constructing a first image, based on the measured data, a single image is obtained and the body information in the scattered data of both subbands is efficiently combined in the constructed first image. By generating synthetic scattered data of the single body in a frequency range outside the subbands, additional scattered data can be provided based on the body image that has already been imaged based on the measured scattered data in the two distinct subbands. Though the physical scattering experiment regarding the frequency range outside the subbands is not accomplished, e.g. due to legislation restrictions, meaningfully scattered data can be retrieved, thus providing an opportunity to improve the overall inversion. As a result, by constructing a second image of the body using both the measured data and the synthetic data, an improved image can be obtained having an increased resolution, since the effective bandwidth related to the scattered data has increased. Further, the finally obtained image has an improved accuracy. A benefit of the invention is that resolution and accuracy is improved without the need for additional physical measurements and the associated scanning time.

Further, by matching, in the step of constructing a first image, an image to a human model, the imaging process can further be improved since information concerning the human body is incorporated in the scheme. The increased resolution and improved accuracy are obtained by implicitly adding body model information in the imaging process. Said body model information is included by generating and employing the synthetic scattered data.

It is noted that an imaging process includes processing steps, performed in measurement data, to obtain an image of the body being scanned.

Advantageously, the matching step comprises selecting a specific parameterization class of a multiple number of human parameterization classes. As a result, during the first imaging step, a rough estimation of the human image is obtained, thereby reducing the solution space, stabilizing the numerical process and improving convergence properties of the inversion scheme.

Further, at least one distinct subband might have a relatively high central frequency, e.g. circa 60 GHz, thereby improving the resolution of the generated image. As an example, another subband of the distinct subbands might have a lower central frequency, e.g. circa 24 GHz.

Applications of the electromagnetic body scanning system include human body measurements, e.g. for determining garment size of clothing, e.g. for virtually fitting clothing, authentication, biometry, identification, monitoring, automatic recognition of gestures, diagnosis, revalidation, physiotherapy, computer interfacing and gaming. In the field of security, the scanning system can be used for concealed weapon detection or for narcotics detection, such as heroine detection. The detection can be performed by detecting outliers with respect to a matched human body model. Further, the system can be used for scanning mammal bodies, such as dogs and cats.

The invention also relates to a method for electromagnetically scanning a body.

Further, the invention relates to a computer program product.

BRIEF DESCRIPTION OF THE DRAWINGS

By way of example only, embodiments of the present invention will now be described with reference to the accompanying figures in which.

It is noted that the figures show merely a preferred embodiment according to the invention. In the figures, the same reference numbers refer to equal or corresponding parts.

DETAILED DESCRIPTION

Figure 1:
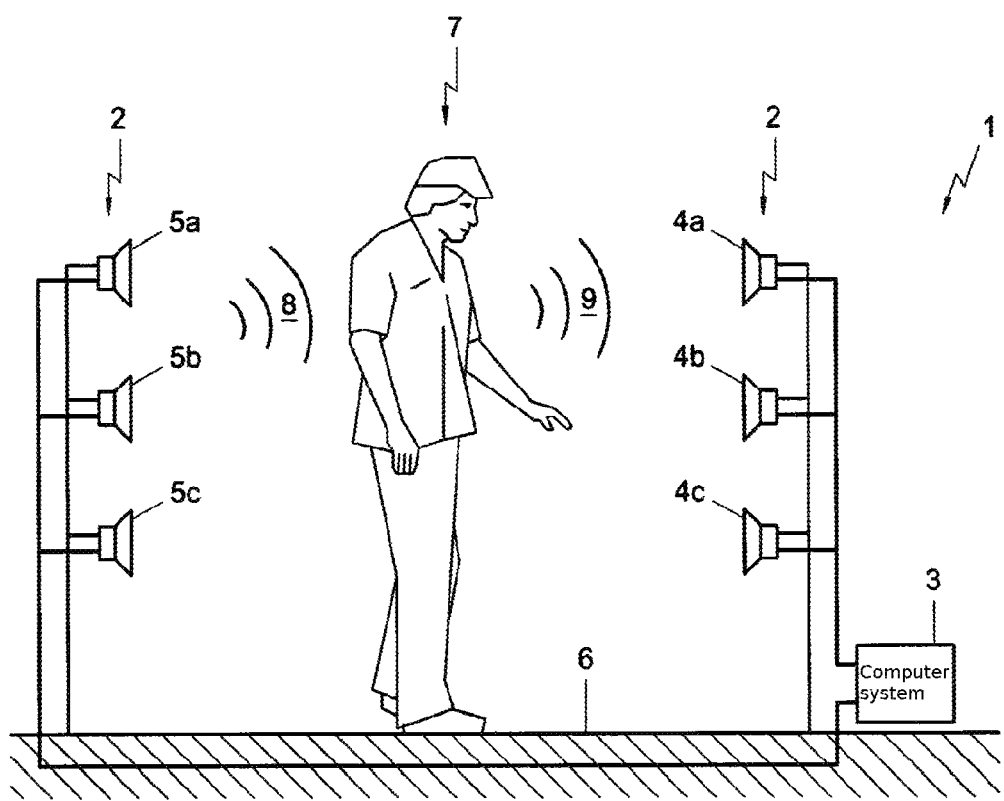
FIG. 1 shows a schematic view of an electromagnetic body scanning system according to the invention.

FIG. 1 shows an electromagnetic body scanning system 1 according to the invention. The system 1 comprises a measuring system 2 and a computer system 3.

The scanning system 2 further comprises a platform 6 on which a person 7 to be scanned can take a position. Further, the measuring system 2 comprises a multiple number of transmitters 4a-c and a multiple number of receivers 5a-c, each of them connected to the computer system. The transmitters 4 and receivers 5 are arranged for transmitting waves 8 and receiving 9, respectively, in a preselected radio subband. It is noted, however, that the measuring system 2 might also be provided with a single transmitter and a single receiver, or even a single device that may act as both a transmitter and a receiver.

As an example, the transmitters 4 and receivers 5 are set to operate at a first subband B1. During a first measurement sequence, a person's body is scanned by using radio waves in the first subband B1. In a next step, the transmitters 4 and receivers 5 are set to operate at a second, distinct, higher subband B2, so that a second measurement sequence of the person's body can be performed. In this context it is noted that, in principle, the first and second measurement sequences can be performed at least partially substantially simultaneously, thereby reducing any errors that would be due to a movement of the person 7 on the platform 6 and increased the scanning speed. An at least partially simultaneous measurement can take place if separate transmitters and receivers are used for the distinct subband measurements. As a result, a measuring step 100 comprises measuring data of radio waves 9 scattered by a body 7 in two distinct subbands.

Figure 2:
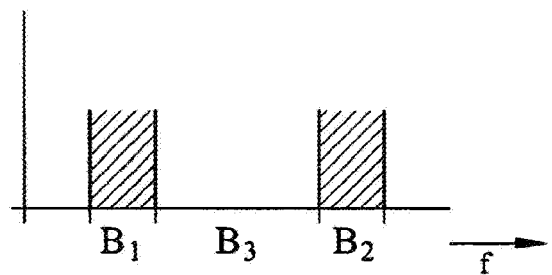
FIG. 2 shows a spectral diagram of the system of FIG. 1.

FIG. 2 shows a spectral diagram of the measurement depending on the frequency f. Here, the first subband B1 is lower than the second subband B2. The intermediate range B3 is the frequency range between both subbands B1 and B2.

Figure 3:
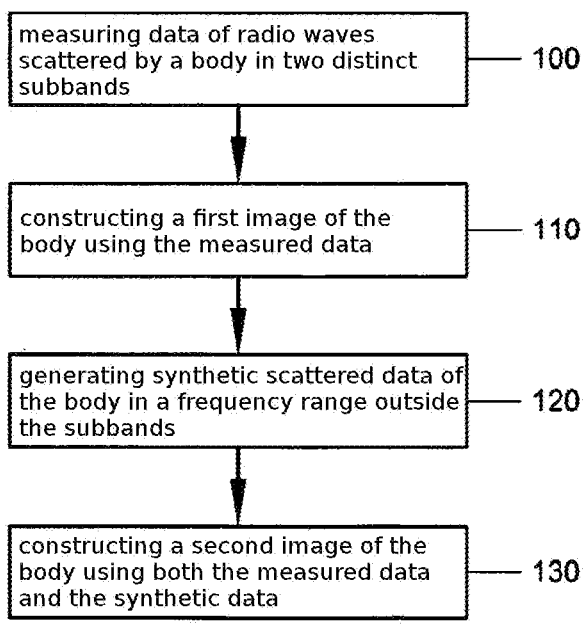
FIG. 3 shows a flowchart of the method according to the invention.

The computer system 3 is arranged for performing a number of steps based on the measurement data. FIG. 3 shows a flowchart of the method according to the invention. The steps comprise a step of constructing a first image 110 of the body 7 using the measured data, a generating step 120 of generating synthetic scattered data of the body 7 in a frequency range outside the subbands, and a step of constructing a second image 130 of the body 7 using both the measured data and the synthetic data. During the step of constructing a first image 110, a single image is constructed, based on the measured data. Further, step of constructing a first image 110 comprises matching an image to a human model.

According to an embodiment according to the invention, the step of constructing a first and/or second image includes determining distance profiles from multiple perspectives from the measured data. This can be performed by applying a Fourier transform to data measured in the frequency domain and subsequently applying a multiplication with respect to the temporal parameter to scale the temporal parameter to map the data to a distance profile. More specifically, the frequency range outside the subbands B1, B2 might comprise the intermediate band B3 between the subbands, so that a synthetic interpolation of scattered data is generated. As a result, the overall bandwidth of the scattered data extends from B1 to B2, thus increasing the resolution of the obtained image in the second image step 130. It is noted that by selecting subbands B1, B2 that are remote, instead of being close to each other, a relatively large overall bandwidth of scattered data can be obtained, thereby further improving the resolution and the accuracy of the image. It is further noted that the frequency range outside the subbands B1, B2, for which synthetic data is generated, might also comprise a part of the intermediate band B3. Further, the frequency range outside the subbands B1, B2 might additionally or alternatively comprise a range of lower and/or higher frequencies than the frequencies of the lowest and/or the highest subbands B1, B2, respectively, thereby providing an extrapolation of the scattered data.

In an advantageous manner, in the generating step 120 of generating synthetic scattered data of the body, an algorithm can be used that is based on a so-called physical optics method for electromagnetic modelling in combination with an electromagnetic model of the human body comprising two or more layers having different dielectric properties. Such an algorithm is e.g. described in "Hybrid method for Analysis of Complex Scatteres" by L. N. Medgyesi-Mitschang e.a. in Proceedings of the IEEE, vol. 77, No. 5, May 1989, page 770-779. The algorithm provides relatively accurate scattering data in a relatively fast way. However, also other computation schemes can be applied for generating the synthetic scattered data.

In an embodiment according to the invention, the step of measuring data comprises measuring radio waves scattered by a body in three or more distinct subbands, e.g. three, four or five subbands. Again, interpolation and/or extrapolation of the scattered data can be obtained using synthetically generated data based on the human model that has been reconstructed based on the measured scattered distinct subband data.

The matching step in the first imaging step 110 comprises selecting a specific parameterization class of a multiple number of human parameterization classes. As an example, the human model comprises a Karhunen-Loève expansion, see e.g. the article "3D description of the human body shape using Karhunen-Loève expansion" by Z. B. Azouz e.a. in the International Journal of Information Technology, describing details of the Karhunen-Loève expansion. As an alternative, the human model is chosen from another parameterization of the human body, e.g. based on the CAESAR data set, see e.g. the article "The space of human body spaces: reconstruction and parameterization from range scans" by B. Allen e.a. in ACM Siggraph 2003, 27-31 Jul. 2003, San Diego, Calif., USA. Advantageously, relevant expert information of the human body is efficiently incorporated into the inversion scheme.

In an advantageous embodiment according to the invention, the second imaging step 130 comprises estimating parameters of the selected specific human parameterization class, thereby efficiently reducing the numerical problem of the final imaging step. In principle, however, the second imaging step 130 can also be executed by performing a general inversion step, without restrictions to the solution space.

In an advantageous manner, the step of constructing a first image includes using an object recognition technique to improve the accuracy of the finally obtained image. Such an object recognition technique is e.g. known from the article "3D face model fitting for recognition" by F. B. ter Haar and R. C. Veltkamp in Proceedings European Conference on Computer Vision (ECCV), 2008. By applying a principal component analysis on a database including a multiple number of body models, a surprisingly accurate image can be obtained to be used for generating the synthetic scattered data and for obtaining the second image.

It is noted that the feature of using an object recognition technique can not merely be used in combination with an electromagnetic body scanning system, but also more generally, in combination with an electromagnetic body scanning system, comprising a measuring system for measuring data of radio waves scattered by a body in a single subband, and a computer system arranged for constructing an image of the body using the measured data. The method for electromagnetically scanning bodies can be performed using dedicated hardware structures, such as FPGA and/or ASIC components. Otherwise, the method can also at least partially be performed using a computer program product comprising instructions for causing a processor of the computer system 3 to perform the above described steps of the method according to the invention.

The invention is not restricted to the embodiments described herein. It will be understood that many variants are possible.

The measurement system comprising the transmitters and receivers might be stationary, but also be implemented such that rotation of the transmitter and receiver structure is allowed around the person to be scanned, thus further improving the resolution of the final image.

Other such variants will be obvious for the person skilled in the art and are considered to lie within the scope of the invention.

What is claimed is:

1. An electromagnetic body scanning system, comprising
a measuring system for measuring data of radio waves scattered by a body in two distinct subbands; and
a computer system arranged for:
constructing a first image of the body using the measured data by matching an image to a human model;
generating synthetic scattered data of the body in a frequency range outside the subbands; and
constructing a second image of the body using both the measured data and the synthetic data.

2. A system according to claim 1, wherein the measuring system comprises a multiple number of receivers and/or a multiple number of transmitters.

3. A system according to claim 1, wherein one of the distinct subbands has a central frequency of circa 60 GHz.

4. A method for electromagnetically scanning a body, the method comprising:
measuring data of radio waves scattered by a body in two distinct subbands;
constructing a first image of the body using the measured data by matching an image to a human model;
generating synthetic scattered data of the body in a frequency range outside the subbands;
constructing a second image of the body using both the measured data and the synthetic data.

5. A method according to claim 4, wherein the frequency range outside the subbands comprises the intermediate band between the subbands.

6. A method according to claim 4, wherein the frequency range outside the subbands comprises a range lower and/or higher than the lowest and/or highest subband, respectively, of the distinct subbands.

7. A method according to claim 4, wherein the step of measuring data comprises measuring radio waves scattered by a body in three or more distinct subbands.

8. A method according to claim 4, wherein the matching step comprises selecting a specific parameterization class of a multiple number of human parameterization classes.

9. A method according to claim 4, wherein the human model comprises a Karhunen-Loève expansion.

10. A method according to claim 4, wherein the second imaging step comprises estimating parameters of the selected specific human parameterization class.

11. A method according to claim 4, wherein the step of generating synthetic scattered data of the body comprises using a so-called physical optics method for electromagnetic modelling in combination with an electromagnetic model of the human body comprising two or more layers having different dielectric properties.

12. A method according to claim 4, wherein the step of constructing a first image includes determining a distance profile from the measured data.

13. A method according to claim 4, wherein the step of constructing a first image includes using an object recognition technique.

14. A non-transitory computer readable storage device having stored therein instructions for electromagnetically scanning a body, the instructions, when executed by a processing device, causing the processing device to perform operations comprising:
constructing a first image of a body using measured data of radio waves scattered by a body in two distinct subbands by matching an image to a human model;
generating synthetic scattered data of the body in a frequency range outside the subbands;
constructing a second image of the body using both the measured data and the synthetic data.

* * * * *